Nov. 7, 1967  R. J. ZIELINSKI  3,351,818
A.C.-OPERABLE VOLTAGE THRESHOLD CIRCUITS
Filed Jan. 8, 1965

INVENTOR:
ROBERT J. ZIELINSKI
BY Howson & Howson
ATTYS.

United States Patent Office 3,351,818
Patented Nov. 7, 1967

3,351,818
A.C.-OPERABLE VOLTAGE THRESHOLD
CIRCUITS
Robert J. Zielinski, Mayfield Heights, Ohio, assignor to
American Gas Association, Incorporated, New York,
N.Y., a corporation of New York
Filed Jan. 8, 1965, Ser. No. 424,316
7 Claims. (Cl. 317—124)

ABSTRACT OF THE DISCLOSURE

An improved circuit of the type in which the existence of a rectifying characteristic of an element is detected by connecting the element in series with a capacitor across an alternating voltage source by connecting the electrodes of a two-element gas-tube system in parallel with the rectifying element, and by using a zero-to-peak value of alternating voltage which is less than the firing voltage of the gas-tube system. The existence of the rectifying characteristic is indicated by repetitive intermittent breakdown of the gas-tube system. In prior devices each such breakdown is generally for a very short fraction of a half cycle of the alternating input voltage, because of rapid discharge of the capacitor. In the improved circuit the diode is shunted by a rectifier poled oppositely with respect to the equivalent rectifier of the rectifying element under test. Each time the gas-tube system fires the normally nonconductive shunting rectifier becomes conductive to bypass the capacitor and thereby apply the alternating voltage to the gas-tube system in sufficient magnitude to maintain the breakdown throughout a substantial portion of a half cycle of the input alternating wave. This results in a larger output indication than in the prior art circuit.

---

In the copending application Ser. No. 417,960, of Robert J. Zielinski and Frederick W. Westberg, filed Dec. 14, 1964, and entitled, Bias-Controlled A.C.-Operable Voltage Threshold Circuit, and Systems Employing Same, there is described a novel form of electrical circuit employing voltage breakdown means which is changed from its low-conduction state to its high-conduction state in response to an alternating input voltage whenever a direct-current conductive element in the circuit provides a lower resistance for one polarity of the input voltage than for the other. In some cases the difference in resistance of the direct-current conductive means is provided by a standard rectifier and in other cases by a radiation-sensitive resistance, or by a flame.

For example, the circuit can be used as a flame sensor by connecting a flame in series with capacitive means and connecting the voltage breakdown means in parallel with the flame. So long as the flame is present it will exhibit a rectifying characteristic which causes a direct-voltage component to develop across the capacitive means; the zero-to-peak value $V_{IN}$ of the input voltage and the firing voltage $V_f$ of the voltage breakdown means are selected with respect to each other so that in the absence of accumulation of such a direct-current component, the voltage breakdown means cannot be fired by the input voltage; but, when the direct-current component of voltage is developed in response to the presence of the rectifying characteristic of the flame, the combination of this direct-current component with one of the polarities of half-cycle of input alternating voltage is sufficient to fire the voltage breakdown means. This firing repeats itself in time so long as the flame is present and the circuit elements and connections intact.

Typically the voltage breakdown means comprises gas discharge means and has a predetermined firing voltage $V_f$ for which the gas discharge means change from a low-conduction state to a high-conduction state, and a substantial extinction voltage $V_x$ lower than $V_f$ for which the gas discharge means resume their low-conduction state. Other applications and forms of this basic type of circuit are described in detail in the above-identified copending application.

It is characteristic of this type of circuit that a high degree of so-called "fail safe" operation is obtained in that failure of any of a variety of components or connections in the circuit produces an indication that rectification is absent, rather than present. Accordingly, in applications to flame sensing such failures in the circuit will not result in spurious indications of the presence of a flame. Where the output of the circuit is utilized, for example, to shut off a supply of gas to the flame, the gas supply will therefore be shut off both when the flame is absent and when a malfunction occurs in the circuit.

In such prior circuits the original output indication comprises the current which flows through the gas discharge means or the resulting radiation produced by the discharge. Where the radiation is utilized as the output indication, it may be observed visually or sensed by radiation-responsive apparatus. In many examples where it is sensed by radiation-sensitive apparatus it is ultimately used to operate some mechanism such as a gas valve, by way of a relay for example. In such circuits it is often necessary to provide an amplifier to convert the relatively weak radiation from the gas discharge means into sufficiently strong electrical signals to operate the final controlled apparatus. To the extent that the output of the gas discharge means can be increased, the amount of amplification required can be reduced or entirely eliminated. Where the output of the gas discharge means is in the form of radiation which is visually observed, the greater the radiation output the easier and more convenient is the visual observation thereof.

Accordingly, it is an object of the invention to provide a new and useful bias-controlled A.C.-operable voltage threshold circuit.

Another object is to provide such a circuit which produces an increased output.

A further object is to provide such a circuit of increased output which at the same time possesses "fail safe" characteristics.

A still further object is to provide the latter type of circuit in a form which is simple and inexpensive and particularly applicable to flame sensing apparatus.

The foregoing objects are achieved in accordance with the invention by the addition, to a circuit of the type described briefly above and in detail in the above-cited copending application, of means responsive to changes in the voltage breakdown means from its low-conduction state to its high-conduction state for effectively bypassing the capacitive means during at least a portion of the remainder of the half-cycle of input alternating voltage which initiates said high-conduction state. In a preferred form of the invention this additional means preferably comprises a rectifying device connected effectively in parallel with the capacitive means and having rectifying characteristics poled oppositely to the equivalent rectifier of the element whose rectification is to be sensed, with respect to the alternating input voltage. The alternating input voltage is less than the firing voltage $V_f$ of the voltage breakdown means but greater than the extinction voltage $V_x$ thereof. As a result, when the rectification characteristics to be detected are present in the circuit, the voltage breakdown means is fired by a half-cycle of the input voltage of a predetermined polarity, as in the prior circuit referred to above. In said prior circuit, firing of the voltage breakdown means causes a rapid discharge of the capacitive means, and the impedance of the capacitive means prevents the voltage applied to the voltage breakdown means from being held above the extinction voltage $V_x$ for any substantial amount of time. The result is that a very short pulse of conduction occurs in the voltage breakdown means.

However in the system according to the invention, once the voltage breakdown means is changed from its low-conduction state to its high-conduction state, the capacitive means is effectively bypassed so that substantially the full input alternating voltage is applied to the voltage breakdown means, and high conduction therefore persists in the voltage breakdown means for a substantial interval of time until the input alternating voltage itself falls below the extinction voltage $V_x$. The result is a very substantial increase in the average radiation or current output of the voltage breakdown means, making possible easier detection of the occurrence of such breakdown or easier operation of control or indicating apparatus in response to the output of the voltage breakdown means. For example, the need for additional amplifiers may be completely obviated and the output of the voltage breakdown means used directly to operate an ordinary relay with consequent reduction in the size and cost of the apparatus. At the same time the other desirable features of the prior art circuit, including its "fail safe" operation, are retained.

Other objects and features of the invention will be more readily understood from a consideration of the following detailed description taken in connection with the accompanying drawings, in which.

Figure 1:
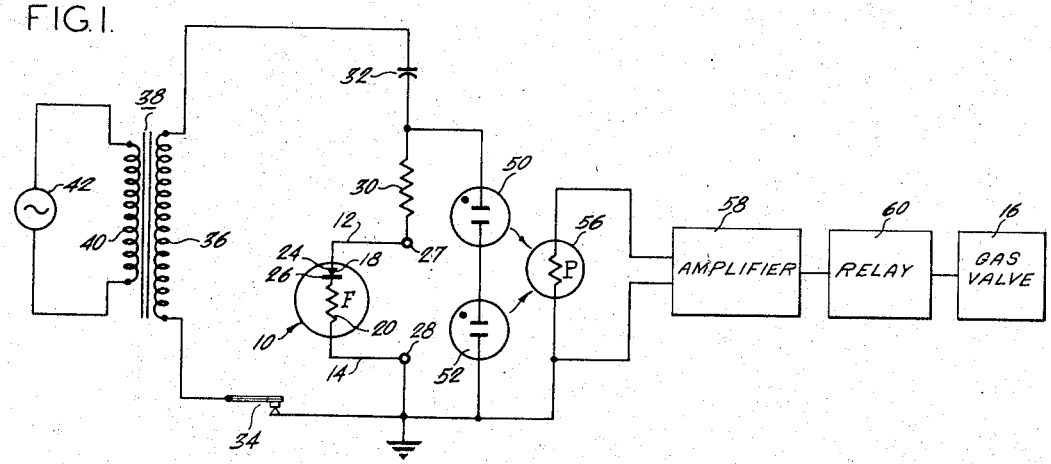
FIGURE 1 is a schematic diagram of an electrical circuit of the general type described and claimed in our earlier-filed copending application, cited above.

Referring specifically to FIGURE 1, there is shown therein a form of circuit in accordance with the invention described and claimed in the above-cited copending application, and with respect to which the present invention constitutes an improvement. In this example the circuit is utilized to detect the presence of a flame 10 between flame-sensing electrodes 12 and 14, and to hold open a gas valve 16 so long as flame 10 persists while permitting the supply of gas by valve 16 to be cut off when flame 10 is absent. The electrodes 12 and 14 contact flame 10 in such a manner that the flame is equivalent to a diode 18 and resistor 20 in series between electrodes 12 and 14.

In this example the equivalent anode 24 of the equivalent flame diode 18 is connected to the upper electrode 12 while the equivalent cathode 26 is connected by way of the equivalent series resistance 20 to the lower flame-contacting electrode 14. Electrodes 12 and 14 are connected respectively to probe connections 27 and 28 whereby the flame 10 is connected in series with resistor 30, capacitive means 32, high-temperature-opening thermostat 34, and secondary 36 of transformer 38. The primary 40 of transformer 38 is supplied with alternating input voltage from source 42. Voltage breakdown means in the form of a pair of series-connected gas discharge lamps 50 and 52 are connected effectively in parallel with flame 10, i.e. between the lower plate of capacitive means 32, which may be an ordinary capacitor, and the lower probe terminal 28, which may be grounded as shown.

The radiation generated by gas discharge lamps 50 and 52 when they "fire," i.e. when they assume their high-conduction state, is optically applied to photoresponsive resistor 56 to decrease its resistance, the variations in resistance of which are sensed and amplified in amplifier 58 and used to change the condition of the relay 60 so as to hold open the gas valve 16 supplying gas to flame 10.

It will be understood that, in a completely automatic system, automatic means are also provided for momentarily opening gas valve 16 when thermostat 34 closes and at the same time applying or turning on an igniter for flame 10. Such apparatus is not shown in the present application but is described in detail in the above-cited copending application.

The general overall operation of the system is then as follows. Assuming that the system is utilized as an automatically-controlled space heater, when the temperature in the region to be heated falls below a predetermined point the thermostat 34 closes, thus supplying alternating input voltage from source 42 across the series combination of capacitive means 32, resistor 30 and flame 10. The gas discharge lamps 50 and 52 are in their low-conduction state prior to this time, but if flame 10 is successfully established and remains between electrodes 12 and 14, then the rectifying effect of flame 10 causes a direct-current component of negative voltage to appear at the lower plate of capacitive means 32 with respect to ground.

Figure 2A:
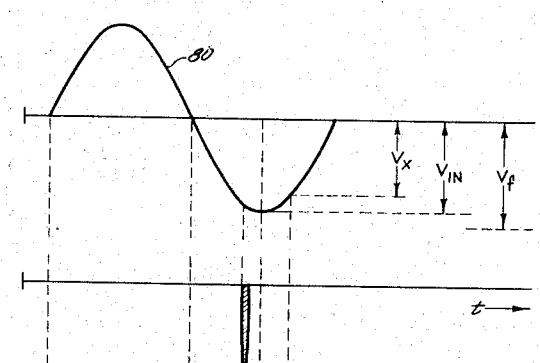
FIGURES 2A, 2B and 2C are each graphical representations, all plotted to the same time scale, to which reference will be made in explaining the operation of the circuit of FIGURE 1 and of the circuit of FIGURE 3.

As illustrated in FIGURE 2A, the input alternating voltage represented by line 80 has a zero-to-peak value $V_{IN}$ which is less than the firing voltage $V_f$ of the combination of gas discharge lamps 50 and 52. Accordingly, the alternating voltage by itself is unable to fire the lamps in the absence of the rectifying characteristics of flame 10, even if short circuits or other malfunctioning of the various portions of the circuit occur. However, as described in detail in the above-cited copending application, the accumulating negative voltage on the lower plate of capacitive means 32 produced by the rectifying characteristics of flame 10 becomes sufficient over one or more cycles of input voltage to cause the total instantaneous voltage across gas discharge lamps 50 and 52 to exceed the firing voltage $V_f$. This results in a narrow pulse of current through the gas discharge lamps and a correspondingly short glow pulse from them.

Figure 2B:
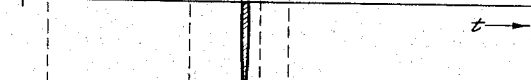

A typical time of occurrence of this pulse is represented in FIGURE 2B, i.e. just prior to the negative peak of the input voltage, and it is seen that the duration of the pulse is relatively short. This is because the charge on capacitive means 32 is quickly dissipated through the gas discharge lamps and the magnitude of the alternating input voltage which reaches the lamps by way of capacitor 32 is less than that sufficient to maintain conduction in the gas lamps, i.e. is less than the extinction voltage $V_x$. However, pulses of this energy are sufficient to produce enough radiation on photoresponsive resistor 56 so that, after appropriate amplification by amplifier 58, the relay 60 is actuated to hold the gas valve 16 open and maintain flame 10. When the temperature of the space to be heated rises above the desired temperature, the thermostat 34 opens, disabling the circuit and permitting gas valve 16 to close. Similarly, should flame 10 for any reason become extinguished or insufficient to contact the two electrodes 12 and 14, or should some malfunction occur in this circuit, the gas discharge lamps 50 and 52 will return to their low conduction states, the glow from them will terminate, and gas valve 16 will reclose.

Figure 3:
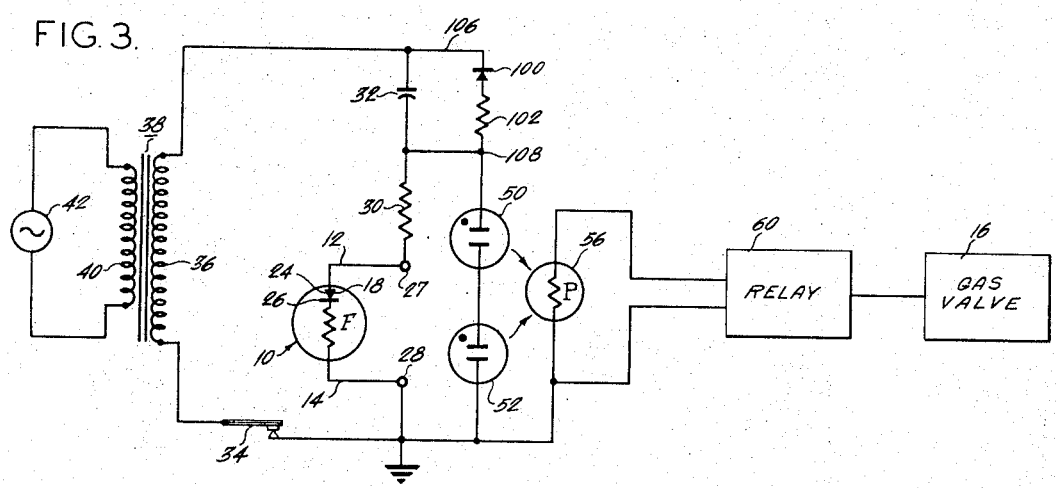
FIGURE 3 is an electrical schematic diagram illustrating one form of circuit in accordance with the present invention.

FIGURE 3 shows the improved circuit in accordance with the invention, in which many of the elements in the basic arrangement are identical to those in the prior arrangement shown in FIGURE 1, and are therefore indicated by corresponding numerals. The only structural difference between FIGURES 3 and 1 lies in the addition, in FIGURE 3, of the series combination of rectifier 100 and resistor 102 in parallel with capacitive means 32, and in the omission of the amplifier 58. It is also characteristic of the arrangement of FIGURE 3 that the zero-to-peak voltage $V_{IN}$ of the input alternating voltage is greater than the extinction voltage $V_x$ of the combination of gas discharge lamps 50 and 52.

The effect of diode 100 and resistor 102 is effectively to bypass capacitive means 32 only when the gas discharge lamps 50 and 52 are rendered conductive. Prior to this time the polarity of diode 100, which is opposite to the polarity of the equivalent rectifier 18 of flame 10 with respect to alternating input voltage, is such as to have no appreciable effect on circuit operation. However, once gas discharge lamps 50 and 52 are switched to their high-conduction states and capacitive means 32 discharged, the upper alternating input voltage supply line 106 is more negative than the upper connection 108 to the gas discharge lamps 50 and 52, so that diode 100 constitutes a substantial short circuit. The input alternating line voltage is therefore applied directly across the series combination of lamps 50 and 52, except for the resistance of resistor 102 which is inserted to limit the current through the discharge lamps to a value providing long life for the lamps 50 and 52. At this time the capacitive means 32 is effectively bypassed. Since the alternating input voltage has a zero-to-peak value $V_{IN}$ greater than the extinction voltage $V_x$ of the combination of lamps 50 and 52, the lamps will be kept in their high-conduction states until the alternating input voltage falls below the extinction voltage $V_x$. This occurs substantially later than the complete discharging of the capacitive means 32, and thus causes a substantial prolongation of the current through lamps 50 and 52 and a consequent prolonging of the pulse of radiation therefrom.

Figure 2C:

FIGURE 2C represents the current pulse through lamps 50 and 52 in the circuit of FIGURE 3. As shown, the current comprises an initial relatively short, but strong, pulse portion 82 produced during the discharging of capacitive means 32; the current then falls momentarily, but rises again when diode 100 has been rendered conductive to a maximum value 83 at the peak of the input voltage; it then falls again, folowing a generally sinusoidal path corresponding to that of the input alternating voltage until the latter voltage falls to the extinction level $V_x$, when the pulse terminates.

The cycle then repeats itself for each cycle of the alternating input voltage, as in the circuit of FIGURE 1, except that in the present case the greater durations of the pulses represent an increased energy, making possible, for example, the complete removal of any amplifier such as 58 in FIGURE 1, with the resultant simplification and reduction in cost of the circuit. Where visual observation of the gas discharge lamps is to be employed, the apparent brightness of the glow is also increased so as to make observation easier. Where the current through the lamps is to be used for control or indicating purposes the increase in electrical power obtained is also clearly advantageous.

The following is one typical example of the circuit of FIGURE 3:

Source 42 may supply alternating input voltage having a zero-to-peak value of about 150 volts and transformer 38 may have a 1:1 voltage ratio. Capacitive means 32 may be a capacitor having a value of 0.002 microfarad, resistors 30 and 102 may have respective values of 0.5 megohm and 10,000 ohms, and gas discharge lamps 50 and 52 may each comprise a General Electric type NE–2H glow lamp each having an extinction voltage $V_x$ of about 55 volts (giving a total extinction voltage for their combinaton of about 110 volts). Photoresponsive device 56 may be a cadmium sulfide photoconductor having a dark resistance greater than 200,000 ohms, and the firing voltage $V_f$ of the two lamps in series may be about 180 volts. Rectifier 100 may be a crystal rectifier such as an RCA type 1N3254. The initial peak of current of the glow lamps is then about 5 milliamperes, which then falls sharply and rises again slightly to a peak of about 3 milliamperes, then dropping to zero as represented in FIGURE 2C. With this arrangement the presence of flame 10 bridging the gap between electrodes 12 and 14 produces a glow which causes the resistance of photoconductor 56 to fall to about 1,000 ohms, as compared with the drop to about 20,000 in the circuit of FIGURE 1. This 20-to-1 improvement in performance enables the direct use of an ordinary A.C. relay for relay 60, without any intervening amplifier.

It will be understood that the improvement constituting the basis of this invention may be employed in any of a large variety of other types of circuits, such as are shown for example in various figures of the above-cited copending application, and is not limited to application to flame-sensing circuits nor to the particular flame-sensing circuit disclosed in the figures.

Accordingly, while the invention has been described in the interest of complete definiteness with particular reference to a specific embodiment thereof, it may be embodied in any of a large variety of forms differing substantially from those specifically shown and described, without departing from the scope or spirit of the invention as defined by the appended claims.

I claim:
1. Electrical apparatus comprising:
a source of alternating input voltage;
capacitive means;
direct-current conductive means connected in series with said capacitive means across said source, said direct-current conductive means having a lower resistance for one polarity of said input voltage than for the other;
voltage breakdown means connected in parallel with said direct-current conductive means and responsive to voltage in excess of a predetermined firing voltage $V_f$ applied thereto to change from a low-conduction state to a high-conduction state and to remain in said high-conduction state until said applied voltage falls to a predetermined extinction voltage $V_x$;
said input voltage having a zero-to-peak value $V_{IN}$ less than said firing voltage $V_f$ but greater than said extinction voltage $V_x$ whereby said voltage breakdown means is changed from said low-conduction state to said high-conduction state in response to the combined effect of direct voltage developed across said capacitive means and a half-cycle of said input voltage of predetermined polarity; and
bypassing means connected across said capacitive means and in common series circuit with said source and said voltage breakdown means, said bypassing means being responsive to said change from said low-conduction state to said high-conduction state for effectively bypassing said capacitive means during at least a portion of the remainder of said half-cycle.

2. Apparatus in accordance with claim 1, in which said bypassing means comprises normally-nonconductive means and means responsive to said change from said low-conduction state to said high-conduction state for rendering said normally-nonconducting means conductive for the duration of said high-conduction state.

3. Electrical apparatus comprising:
capacitive means;
asymmetrically-conductive means in series with said capacitive means;
means for applying an alternating input voltage across the series combination of said capacitive means and said asymmetrically-conductive means;
voltage breakdown means connected in parallel with said asymmetrically-conductive means and responsive to voltage in excess of a predetermined firing voltage $V_f$ applied thereto to change from a low-conduction state to a high-conduction state until said applied voltage falls to a predetermined extinction voltage $V_x$;
said input voltage having a zero-to-peak value $V_{IN}$ less than said firing voltage $V_f$ but greater than said extinction voltage $V_x$ whereby said voltage breakdown means is changed from said low-conduction state to said high-conduction state in response to the combined effect of direct voltage developed across said capacitive means and a half-cycle of said input voltage of predetermined polarity; and bypassing means connected across said capacitive means and in common series circuit with said alternating input voltage and said voltage breakdown means, said bypassing means being responsive to said change from said low-conduction state to said high-conduction state for effectively bypassing said capacitive means during at least a portion of the remainder of said half-cycle.

4. Apparatus in accordance with claim 2, in which said last-named means comprises a rectifying device connected effectively in parallel with said capacitive means and poled oppositely to said asymmetrically-conductive means with respect to said input voltage.

5. Apparatus in accordance with claim 4, comprising a current limiting resistor in common series circuit with said rectifying device and said voltage-breakdown means.

6. Apparatus in accordance with claim 3, in which said voltage breakdown device comprises diode gas-discharge means.

7. Apparatus in accordance with claim 3, comprising relay means having an operating element responsive to the occurrence of said high-conduction state in said voltage breakdown means.

References Cited

UNITED STATES PATENTS

| | | | |
|---|---|---|---|
| 2,006,737 | 7/1935 | Gessford | 315—188 |
| 2,352,240 | 6/1944 | Wolfner | 317—149 X |
| 2,481,667 | 9/1949 | Holden | 317—149 X |
| 2,556,961 | 6/1951 | Feigal | 328—6 X |
| 2,619,595 | 11/1952 | Russell | 328—6 |
| 2,870,329 | 1/1959 | Aubert | 328—6 |
| 2,964,686 | 12/1960 | Maddox | 328—6 X |

THOMAS B. HABECKER, *Acting Primary Examiner.*

NEIL C. READ, *Examiner.*

D. L. TRAFTON, *Assistant Examiner.*